July 12, 1932.    K. C. D. HICKMAN    1,866,973
RECORDING MANOMETER
Filed Feb. 17, 1928    2 Sheets-Sheet 1
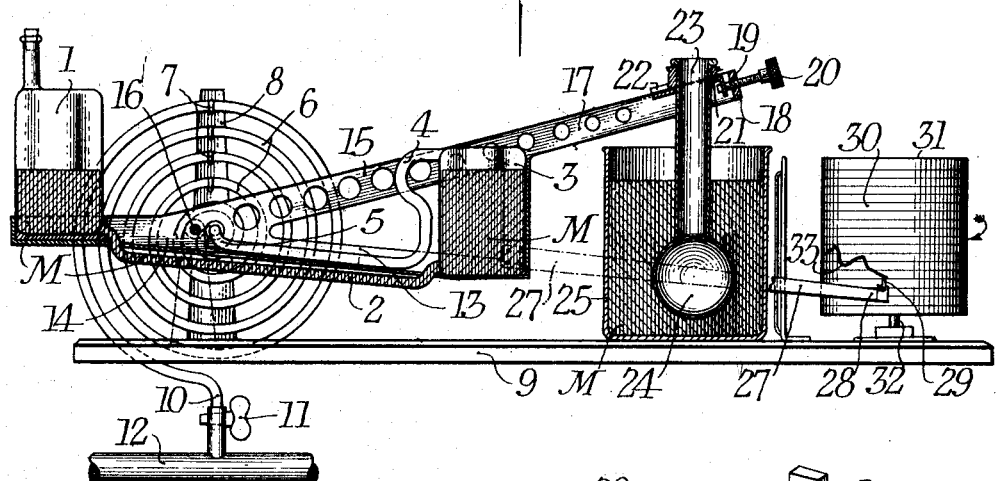
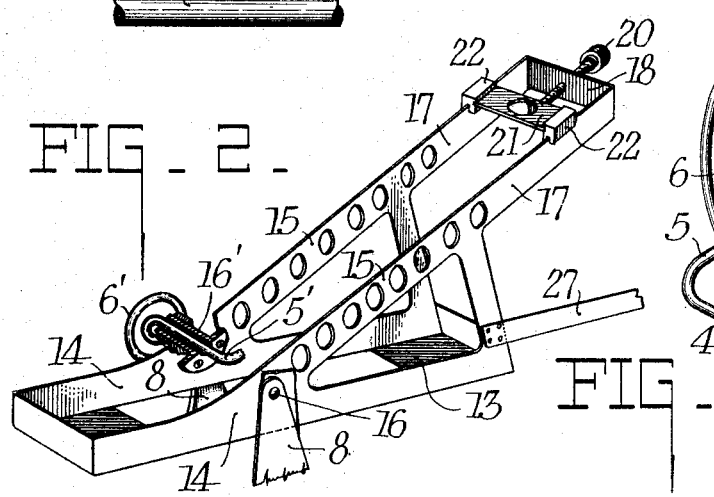
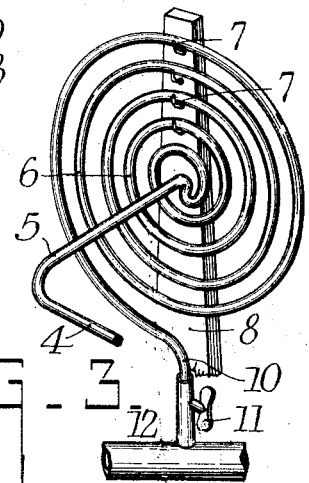
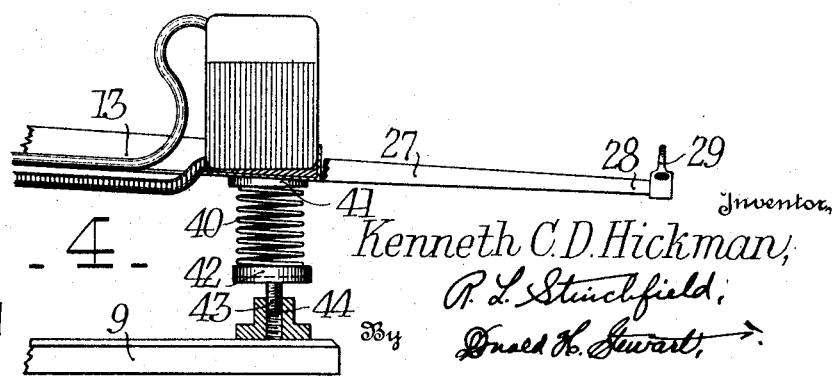

July 12, 1932.  K. C. D. HICKMAN  1,866,973
RECORDING MANOMETER
Filed Feb. 17, 1928   2 Sheets-Sheet 2
FIG_5_
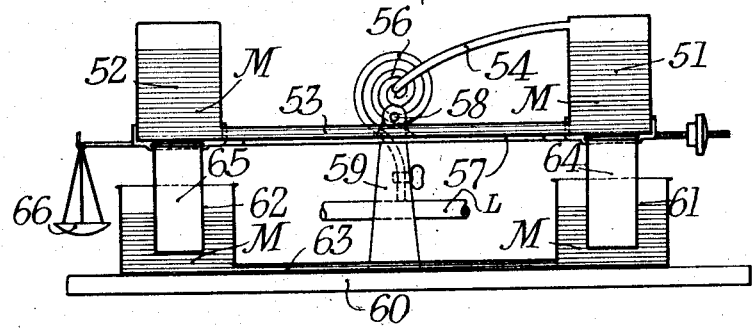
FIG_6_
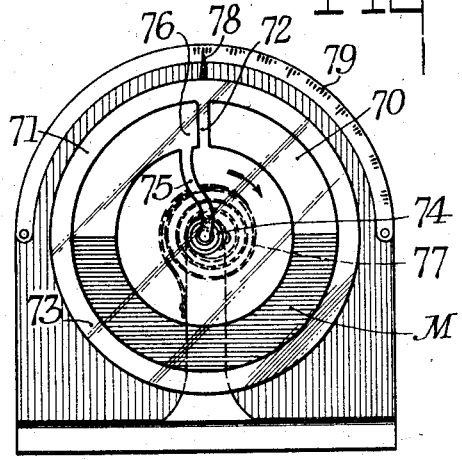
Inventor
Kenneth C.D. Hickman,
R. L. Stinchfield.
By Donald H. Stewart,
Attorneys Patented July 12, 1932

1,866,973

UNITED STATES PATENT OFFICE

KENNETH C. D. HICKMAN, OF ROCHESTER, NEW YORK, ASSIGNOR TO EASTMAN KODAK COMPANY, OF ROCHESTER, NEW YORK, A CORPORATION OF NEW YORK

RECORDING MANOMETER

Application filed February 17, 1928. Serial No. 255,132.

This invention relates to vacuum measuring instruments, and particularly to instruments of the type which give a continuous record or from which readings may be taken at any time. One object of my invention is to provide a manometer which is accurate and which has a wide range adapted successfully to care for a large variation in pressures. Another object is to provide an instrument in which the recording member has a large travel so that a scale from which the values may be read may be of large size and consequently easy to read. Another object is to provide a self-recording instrument which inscribes its own record of a change in pressure down to at least one one-hundredth of a millimeter of mercury and which employs no relays of outside energy to move the pen. Another object is to provide an instrument which is self-registering and which requires no adjustments or manipulations in use. Still another object is to provide an instrument employing connected mercury tubes mounted in a carrier in connection with a compensating mechanism, and other objects will appear hereinafter from the following specification, the novel features being particularly pointed out in the claims at the end thereof.

One of the usual methods of measuring moderate degrees of vacuum is afforded by the "U-tube" mercury manometer. When, however, the pressure is less than one millimeter of mercury, accurate reading becomes difficult and recourse must be made to the McLeod gauge or similar devices. Such gauges are not self-registering and require manipulation, even for visual use.

My invention is designed to overcome these difficulties, retaining the simplicity and essential properties of the U-tube mercury manometer, but extending its behavior to give a gauge accurate to a small fraction of a millimeter.

Coming now to the drawings, wherein like reference characters denote like parts throughout—

Fig. 1 is part elevation, part section of a recording manometer constructed in accordance with and illustrating a preferred embodiment of my invention;

Fig. 2 is a perspective view of a carrier which is constructed in accordance with another embodiment of my invention;

Fig. 3 is a perspective view of a preferred form of flexible lead in to the carrier from a vacuum or air evacuating line;

Fig. 4 is a fragmentary side elevation partly in section, of another type of compensating mechanism;

Fig. 5 is a diagrammatic side elevation of still another embodiment of my invention; and Fig. 6 is a diagrammatic view of another type of manometer constructed in accordance with my invention.

My invention broadly consists in a mercury U-tube of special shape pivoted about a point between the two upright limbs. The preferred shape embodies two short fat limbs connected by a longer narrower base tube. For vacuum measurement, the end of one limb is closed and the other limb is connected flexibly to a gas evacuating line. For pressure measurements the end of one limb is open and the other limb is connected flexibly to a pressure line.

A small change in pressure (negative or positive) transfers mercury from one limb to the other, causing the U-tube to tip, and this empties a further quantity of mercury, causing the tube to tip still further. Ultimately a small pressure change would completely tip over the U-tube about its pivot. To prevent this, I provide a compensator, as, for instance, a plunger in a dash pot of mercury, to limit the degree of tip for any predetermined pressure.

In the embodiment shown in Fig. 1, the U-tube comprises three main parts which may be referred to as a mercury tube 1, a connecting tube 2 and a mercury tube 3. Tubes 1 and 3 are made of much greater diameter than tube 2, since the flow of mercury actuates the mechanism to be hereinafter described.

One of the tubes, preferably tube 3, is connected to a tube 4 which is bent at 5 and is then formed into a spiral or helix 6. Helix 6 is preferably formed of very flexible tubing and may be supported upon hooks 7 on bracket 8, this bracket being carried by the base 9. Tube 4 terminates at 10 near the valve 11, which admits pressure variations to pass from the line pipe 12.

The mercury tubes 1, 2 and 3 are mounted on a pivoted carriage 13 consisting of a frame 14 having side arms 15 pivoted at 16 to a pair of brackets 8 carried by the base 9 (only one bracket being shown).

The arms 15 are extended at 17, being joined at 18, member 18 being tapped at 19 to support a screw 20 for moving a slide 21 carried by shoes 22 which move on arms 17. Slide 21 supports a compensating mechanism, here shown as a plunger 23, formed of a tubular member having a hollow ball 24 on the lower end suspended in a vessel 25 having mercury M therein.

The only function of the ball 24 is to obtain greater displacement to counteract the the weight of the carriage. If desired, a tube of like diameter throughout could be employed, as in Fig. 5.

The carriage 13 has an arm 27 extending out and terminating at 28 some distance from the carriage so that as this member moves about the pivots 16, the arm at 28 moves a considerable distance. An arm 27 carries at 28 a recording point 29 adapted to bear upon a chart 30 graduated into units denoting various degrees of vacuum. Chart 30 is carried by a drum 31 rotated upon a shaft 32 by a suitable mechanism.

The operation of the above described embodiment of my invention is as follows: By turning cock 11, the pressure of line 12 is permitted to act upon the manometer by changing the pressure in flexible tube 6 and through tube 4 to the mercury columns 1 and 3.

As in the usual manometer, changes in degree of vacuum or pressure alter the relative heights of mercury columns 1 and 3. Unlike the usual manometer, however, the changing mercury causes the pivoted carriage 13 to move about its pivots 16, thus causing the plunger 23—24 to move in its mercury bath, thereby limiting the movement of the carriage. Thus, arm 28 through the recording point 29 traces a graph 33 upon chart 30 and the changes and pressure on line 12 are recorded.

In this apparatus it should be particularly noted that tube 4 at 5 is bent substantially parallel to pivots 16 and the helix 6 renders it substantially frictionless so that the movement of the carriage is not retarded. It is preferable to run out tube 4 at 5' through a hollow pivot 16', as shown in Fig. 2, since the movement of the tube will be thereby reduced to a minimum.

It is, of course, possible to alter the effect of the compensator of Fig. 1 by turning screw 20, thus materially altering the leverage of the float. However, after once calibrating the instrument, no further attention is necessary and the degree of vacuum is traced on the chart and may be easily read from graduations on the chart at any time.

It is immaterial what type of compensator is used so long as the increase in the turning moment, due to mercury transfer, caused by the change in pressure, together with the increase in turning moment, due to gravitational transfer of mercury for the deflection involved, shall be equal to the increase in turning moment exhibited in the opposite sense by the compensating device.

Accordingly, another type of compensator, such as shown in Fig. 4, may be used. Here a spring 40 is held by a pad 41 beneath the carriage 13 and by an adjustable pad 42 carried by a screw 43 movable in the socket 44 of base 9. Springs are, as a rule, more difficult to calibrate than the compensator of Fig. 1.

The sensitivity of the instrument can be varied by the position of the plunger relative to the pivoted carriage. The sensitivity may be very large. It is the ratio of the quantity of mercury transferred by gravity to the quantity transferred by pressure and it is greatest when this ratio is greatest. It is limited only by the tendency of the mercury to stick to the wall of the tubes. To minimize sticking, I place in each of the tubes 1 and 3 a small quantity of liquid of low vapor pressure, the liquid having the property of wetting glass more strongly than mercury does. Such a liquid is provided by the high-boiling oils commonly used in vacuum pumps.

The first described embodiment of my invention is sensitive to changes in level as the surfaces of the mercury surfaces must be level when the recording arm reads zero. If this is a disadvantage for certain purposes, the instrument shown diagrammatically in Fig. 5 may be employed. Here two mercury columns 51 and 52 are connected by tube 53 and a flexible tube 54 leads from column 51 through a flexible coil 56 to a pressure line L. Both columns and the connecting tube are supported by a carriage 57 pivoted at 58 to brackets 59 carried by a base 60. The pivot 58 is symmetrically arranged and the two mercury columns are similar in size, so that the carriage is balanced at atmospheric pressure.

Also on base 60 is a compensator including a second U-shaped member composed of pots 61 and 62 connected by a tube 63, each pot containing mercury M. Into these pots extend similar plungers 64 and 65 carried by carriage 57 and arranged symmetrically thereon.

Pressure changes through tube 54 alter the relative levels of the mercury M in columns 51 and 52 and consequently the plungers 64—65 will move relative to the mercury M in pots 61—62. The deflection of the carriage 57 may be readily used to determine the pressure change by adding weights to one side 66 until the zero position is restored, and using this weight to compute a scale from which the various pressures may be read or on which such pressures may be recorded. Such a gauge may be accurate up to one one-hundredth of a millimeter of mercury.

Still another embodiment of my invention is shown in Fig. 6, wherein a channel or groove 70 is cut or formed in one surface of a disk 71 annular in shape except for a barrier 72. To this may be cemented a glass face 73, pivoted upon a tubular trunnion 74. Through trunnion 74 there extends a tube 75 leading to one side 76 of the barrier 72 and to a vacuum or pressure line.

The channel 70 is half filled with mercury which fills the end opposite 76. A spiral spring 77 about trunnions 74 opposes movement of the disk in the direction shown by the arrow so that as air is evacuated from tube 75 (and channel 70) mercury comes away from the barrier and the disk 71 turns, thus moving a pointer 78 over a scale 79 calibrated in any desired units of measurement for pressure. In this embodiment the spring serves as a compensator.

It is obvious from the above described embodiments that my invention may assume many different forms and it is understood that the embodiments shown in the drawings are by way of illustration only. I consider as within the scope of my invention all such modifications and equivalents as may come within the scope of the appended claims.

Having thus described my invention, what I claim as new and desire to secure by Letters Patent is:

1. In combination, a recording instrument including a support, a carriage pivotally mounted upon the support, a pair of connected mercury columns carried by the carriage, means for evacuating air from one mercury column including a spirally coiled flexible tube connected to one mercury column and passing from the carriage at its pivotal support to the base, and means for evacuating air from the mercury column, and a recording member mounted to move with the carriage to indicate the degree of vacuum.

2. In combination, a recording instrument including a support, a carriage pivoted to the support, a pair of mercury columns carried by the carriage, connections between the mercury columns, a tubular connection between one column and an air evacuating line, a compensating device connected to one side of the carriage, and means for measuring the transferred mercury whereby the degree of vacuum may be obtained.

3. In combination, a recording instrument including a base, a carriage pivoted to the base, a pair of connected mercury columns mounted on the base, means including connections to a pressure line for causing mercury to flow from one column to the other, said mercury transfer causing the carriage to move on its pivot, a compensating mechanism adapted to control the movement of the carriage, and means associated with the carriage for indicating the degree of vacuum.

4. In combination, a recording instrument including a base, a carriage pivoted thereto, a U-shaped mercury tube, a pressure pipe leading from the U-shaped tube and connecting it to a vacuum line, said vacuum line being adapted to move the mercury in the U-shaped member whereby said member may swing upon its pivoted carriage, and a compensator for limiting the movement of the carriage, a scale and a pointer carried on the carriage and base, said carriage movement being adapted to indicate on the scale the degree of vacuum in the pressure line.

5. In combination, a recording instrument including a base, a carriage pivoted on the base, a U-shaped mercury tube, a pressure pipe leading from the U-shaped tube and connecting it to a vacuum line, said vacuum line being adapted to move the mercury in the U-shaped tube whereby said member may swing upon its pivotal carriage, and a compensating mechanism comprising a float, a mercury support for said float, said compensating mechanism being adapted to limit the movement of said carriage upon said support.

Signed at Rochester, New York, this 13th day of February 1928.

KENNETH C. D. HICKMAN.